(12) United States Patent
Iwasaki

(10) Patent No.: US 7,119,791 B2
(45) Date of Patent: Oct. 10, 2006

(54) MOUSE

(75) Inventor: Junichi Iwasaki, Tochigi (JP)

(73) Assignee: Mitsumi Electric Co. Ltd., Tokyo (JP)

( * ) Notice: Subject to any disclaimer, the term of this patent is extended or adjusted under 35 U.S.C. 154(b) by 203 days.

(21) Appl. No.: 09/941,620

(22) Filed: Aug. 30, 2001

(65) Prior Publication Data

US 2002/0024502 A1  Feb. 28, 2002

(30) Foreign Application Priority Data

Aug. 31, 2000 (JP) ............................. 2000-263329
Aug. 31, 2000 (JP) ............................. 2000-263330

(51) Int. Cl.
*G09G 5/08* (2006.01)
(52) U.S. Cl. ...................... 345/163; 345/156
(58) Field of Classification Search ........ 345/163–166, 345/156–157, 168, 169; 250/221, 224; 710/73; 361/685; 341/22, 23
See application file for complete search history.

(56) References Cited

U.S. PATENT DOCUMENTS

| | | | |
|---|---|---|---|
| 4,807,749 A * | 2/1989 | Ackeret ...................... 206/307 |
| 5,341,421 A * | 8/1994 | Ugon .......................... 345/163 |
| 5,559,672 A * | 9/1996 | Buras et al. ................. 361/684 |
| 5,794,553 A * | 8/1998 | Futamura .................. 112/102.5 |
| 6,055,592 A * | 4/2000 | Smith .......................... 710/73 |
| 6,080,064 A * | 6/2000 | Pieterse et al. ............... 463/42 |
| 6,198,473 B1 * | 3/2001 | Armstrong .................. 345/163 |
| 6,337,919 B1 * | 1/2002 | Dunton ....................... 382/124 |
| 6,417,911 B1 * | 7/2002 | Kniazzeh et al. ............. 355/27 |
| 6,525,306 B1 * | 2/2003 | Bohn .......................... 250/221 |
| 2002/0005834 A1 * | 1/2002 | Oh .............................. 345/163 |
| 2002/0140678 A1 * | 10/2002 | Kawashima et al. ........ 345/166 |
| 2002/0167470 A1 * | 11/2002 | Chung .......................... 345/63 |

FOREIGN PATENT DOCUMENTS

JP  10-143270  5/1998

* cited by examiner

*Primary Examiner*—Xiao Wu
(74) *Attorney, Agent, or Firm*—Whitham, Curtis, Christofferson & Cook, PC

(57) ABSTRACT

In a mouse connected to a personal computer, a casing body is provided with a space for housing a data storage medium therein. A data processor communicates data between the personal computer and the data storage medium housed in the casing body. A door member covers an opening formed on the casing body, through which the data storage medium is attached or detached, in a closed position thereof. The door member constitutes a part of an outer face of the casing body at the closed position thereof.

16 Claims, 5 Drawing Sheets

MOUSE

BACKGROUND OF THE INVENTION

The present invention relates to a coordinate input device, and more particularly to a mouse.

A so-called mouse for being moved on a flat surface to carry out an input operation has widely been utilized as a coordinate input device, for example.

Such a mouse comprises a mechanical movement detector for detecting a direction and a rotation amount of a ball which is rotatably supported in a case, or an optical movement detector for optically detecting the horizontal movement of the case, for example.

According to the mouse having such a structure, the case is horizontally moved so that the amount of the movement in an XY direction is detected by the mechanical or optical movement detector corresponding to the amount of the movement, and a detection signal is output to a connected personal computer.

While coordinates are input, a plurality of operation buttons are properly operated so that various input operations can be carried out.

Recently, a mouse comprising an interface in the USB standard has spread. Such a mouse can be connected to a USB connector commonly provided with another keyboard of a personal computer or various peripheral apparatuses.

On the other hand, a small-sized storage medium such as a compact flash, a smart medium or a memory stick has been used with the spread of a digital camera. By using these storage medium, data fetched by the digital camera can be easily transferred to the personal computer so that the data can be edited on the personal computer.

However, many personal computers which have currently been used do not comprise an interface capable of directly accessing these storage medium. In such a personal computer, therefore, it is necessary to add an interface device for mutually connecting the storage medium to the personal computer in order to use the storage medium.

In such an interface device, for example, there has been known an adapter attached to a PC card slot. By using such an adapter, the PC card slot is dedicated. Therefore, there is a problem in that another peripheral apparatus is prevented from being added.

Furthermore, in a case where an insertion unit of the storage medium is provided externally on the personal computer, it is necessary to newly maintain a space for providing the insertion unit around the personal computer and a cable for connecting the insertion unit to the adapter is required. Consequently, the periphery of the personal computer becomes messy.

SUMMARY OF THE INVENTION

It is therefore an object of the invention to provide a mouse which also serves as an interface device for a storage medium.

In order to achieve the above object, according to the present invention, there is provided a mouse connected to a personal computer, comprising:

a casing body, provided with a space for housing a data storage medium therein; and a data processor, which communicates data between the personal computer and the data storage medium housed in the casing body.

In this configuration, various apparatuses to which the mouse is connected such as the personal computer can utilize the data storage medium as an auxiliary storage. The mouse is connected to various apparatuses so that the data storage medium can also be connected to the same apparatuses.

Therefore, it is possible to provide a mouse which also serves as an interface device of the data storage medium.

Preferably, the mouse further comprises a door member which covers an opening formed on the casing body, through which the data storage medium is attached or detached, in a closed position thereof. The door member constitutes a part of an outer face of the casing body at the closed position thereof.

In this configuration, foreign matters such as dust can be prevented from entering the inside through the opening. Further, the data storage medium is not protruded from the outer face of the casing body during the use of the mouse. Therefore, the operability of the mouse is not deteriorated.

Here, it is preferable that the door member includes a pair of first doors which is pivotable laterally.

Further, it is preferable that the door member includes a second door which is pivotable vertically.

In the above configurations, each of the doors may be constituted to be small-sized. Consequently, since the amount of the protrusion of the doors can be lessened when opening the doors, handling can be simplified.

Still further, it is preferable that the second door retains the first doors at the closed position thereof, when the second door is closed.

In this configuration, the whole structure can be simplified so that a cost can be reduced. Furthermore, the operation for opening or closing each of the doors can be simplified and the data storage medium can be inserted or pulled out easily.

Still further, it is preferable that the mouse further comprises an urging member which urges at least one of the first doors and the second door toward an opened position thereof.

In this configuration, since the first doors are automatically opened when the retention of the first doors in the closing state is released, the operation for opening and closing the doors can be simplified and the data storage medium can be inserted or pulled out easily.

Alternatively, it is preferable that the mouse further comprises an urging member which urges the door member toward the closed position thereof.

Here, it is preferable that the mouse further comprises a button member, which opens the door member against the urging force of the urging member when the button member is depressed.

Preferably, the mouse further comprises an ejector for moving the data storage medium housed in the casing body toward the opening.

In this configuration, when the storage medium is ejected from the housing space, the user operates the ejector so that the data storage medium is pushed out of the housing space and the end of the storage medium is exposed from the opening. Consequently, the user can easily take out the data storage medium by holding the end thereof protruded from the opening by hands and pulling out it from the housing space.

Here, it is preferable that the ejector includes a slider which is supported within the casing so as to be slidable in an inserting/ejecting direction of the data storage medium.

In this configuration, the data storage medium is moved in the ejecting direction toward the opening together with the slider through the sliding operation of the slider so that the data storage medium is pushed out of the housing space and the end of the data storage medium is exposed from the opening.

Further, it is preferable that the slider includes a projection engaged with a concave portion which is previously formed on the data storage medium.

In this configuration, the projection of the slider is engaged with the concave portion provided in the data storage medium so that the data storage medium is moved in the ejecting direction through the sliding operation of the slider.

Also, it is preferable that the slider includes an operating member which is exposed to the outside of the casing body so as to be movable in the inserting/ejecting direction of the data storage medium. The operating member is moved toward the ejecting direction so that the slider is moved toward the opening.

In this configuration, the user slides the operating member exposed to the outside of the case so that the slider is slid and the data storage medium is moved in the ejecting direction.

Preferably, the slider is always urged toward the inserting direction of the data storage medium.

In this configuration, the slider is not slid accidentally in the ejecting direction when the data storage medium is connected to the data processor. Thus, the data storage medium can be electrically connected to the data processor reliably.

Preferably, the mouse further comprises a cable, through which the data processor communicates the data.

In this configuration, the mouse can be used in the same manner as a conventional mouse of a cable connection type.

Here, it is preferable that the cable is connected to a USB standard connector provided with the personal computer.

Alternatively, it is preferable that the cable is connected to a PS/2 standard connector provided with the personal computer.

Alternatively, it is preferable that the data processor communicates the data wirelessly.

In this configuration, the mouse can be used as a wireless mouse. Consequently, a connection cable is not required. Thus, operability can be enhanced and portability can be further enhanced.

BRIEF DESCRIPTION OF THE DRAWINGS

The above objects and advantages of the present invention will become more apparent by describing in detail preferred exemplary embodiments thereof with reference to the accompanying drawings, wherein like reference numerals designate like or corresponding parts throughout the several views, and wherein.

DETAILED DESCRIPTION OF THE PREFERRED EMBODIMENTS

Figure 1:
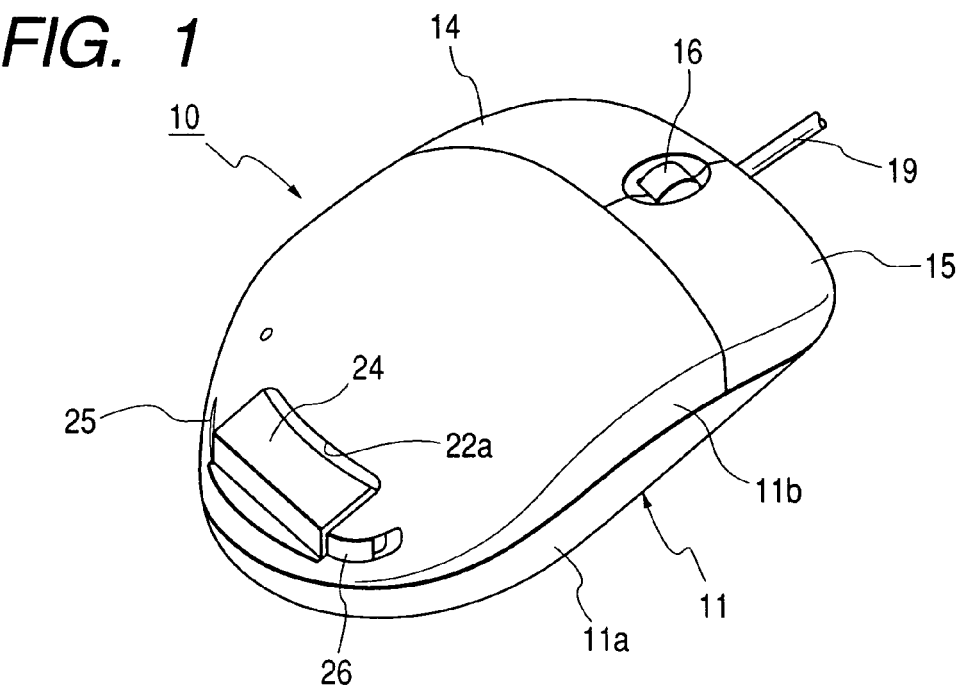
FIG. 1 is a schematic perspective view showing a mouse according to a first embodiment of the invention.

The invention will be described below in detail with reference to the accompanying the drawings.

FIGS. 1 to 4 show a mouse according to a first embodiment of the invention.

In these figures, a mouse 10 is constituted by a case 11, an optical movement detector 12 provided in the case 11, an LED 13 to be a light emitter, two operation buttons 14 and 15 provided on the upper face of the case 11, switches 14a and 15a provided in the case 11 for being operated by the two operation buttons 14 and 15, a wheel 16 provided between the operation buttons 14 and 15, a lens optics 17, and an adapter unit 20 for accepting a storage medium.

The optical movement detector 12 and the LED 13 are mounted on a board 18 provided in the case 11.

Moreover, the case 11 is actually constituted by a lower case 11a and an upper case 11b.

The optical movement detector 12 is constituted to be a semiconductor chip and has a light receiving face 12a provided on a lower face thereof.

The optical movement detector 12 has been put on the market as an optical sensor, for detecting a change in the state on a reflecting surface, which reflects light emitted from the LED 13 to the light receiving face 12a, so that horizontal directions and an amount of relative movement with respect to the reflecting surface are detected.

The LED 13 is attached sideways onto the board 18 and light is emitted downward through the lens optics 17.

The switches 14a and 15a are attached to the lower case 11a of the case 11 and are turned on/off by depressing the two operation buttons 14 and 15 provided on the upper face of the case 11.

Similarly, the wheel 16 is attached to the lower case 11a of the case 11 and the rotation amount is detected by a sensor which is not shown.

A detection signal detected by the optical movement detector 12, the on/off operation of the switches 14a and 15a and the rotation amount of the wheel 16 are processed through a proper processing circuit (not shown) constituted on the board 18 and are then converted into a signal corresponding to a USB interface through a USB control circuit (not shown), and furthermore, the signal is sent from a USB hub (not shown) to a personal computer through a cable 19 or wirelessly by utilizing infrared transmission or the like.

In the case of the wireless transmission, a power battery may be provided in the case 11.

The lens optics 17 is provided under the optical movement detector 12 between the board 18 and a bottom face of the lower case 11a of the case 11.

The lens optics 17 serves as a reflecting surface for the LED 13 and a convex lens for the light receiving face 12a. Consequently, light sent from the LED 13 is reflected downward and is collected, while the light reflected from the reflecting surface (not shown) such as a surface of a desk is collected into the light receiving face 12a of the optical movement detector 12.

The adapter unit 20 is constituted by a housing portion 22 to accept a storage medium 21, a connector 23 provided on the innermost portion of the housing portion 22, and a data processor 100 connected to the connector 23.

The data processor corresponds to the USB interface and is connected to the USB hub.

The housing portion 22 forms an internal space having the shape of a flat rectangular parallelepiped, corresponding to the shape of the storage medium 21 (a memory stick in the drawing) and includes an opening 22a on a rear side (closer to the operator's hand) of the upper case 11b of the case 11.

Figure 3:
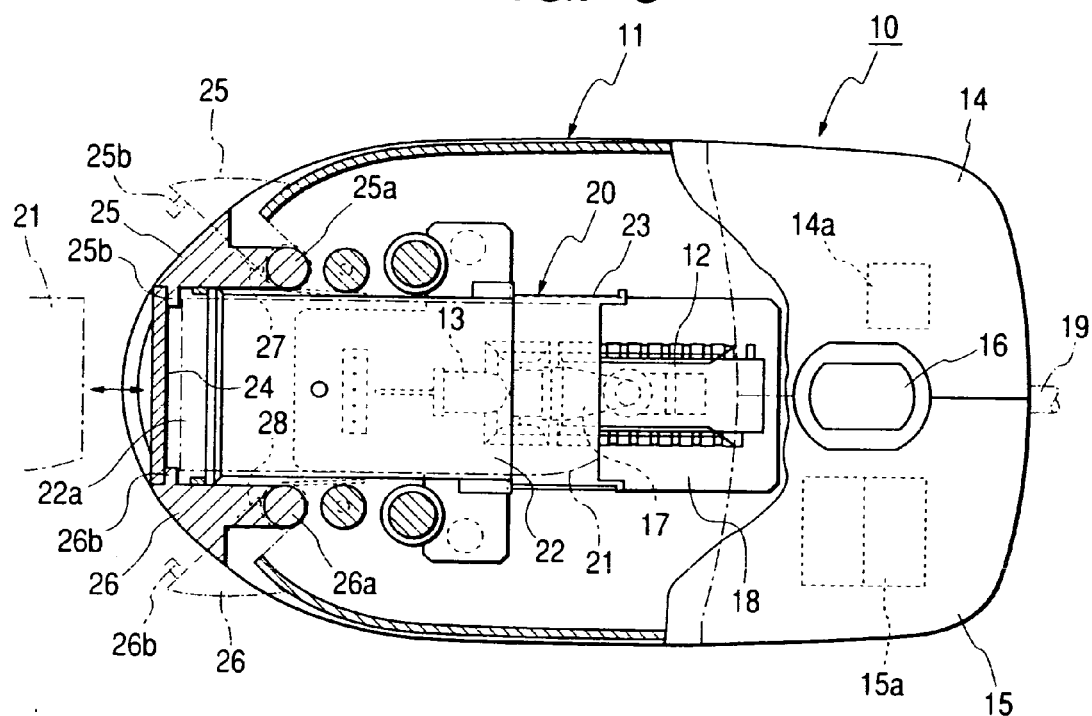
FIG. 3 is a partially-sectional plan view of the mouse.
Figure 4:
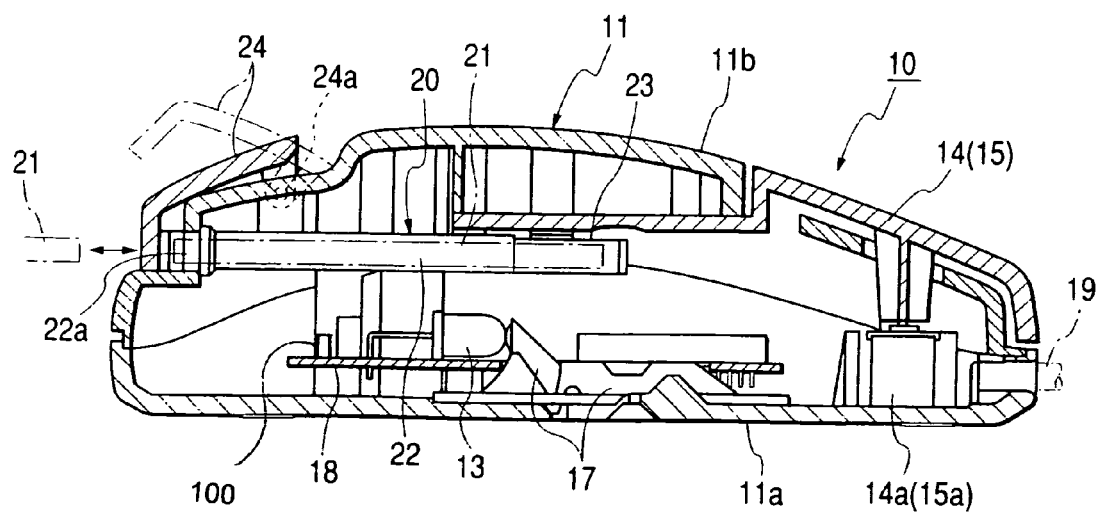
FIG. 4 is a longitudinal sectional view of the mouse.

In the accepted state of the storage medium 21, both sides of a rear end thereof are exposed from both side portion of the opening 22a so that the operator can pick the rear end portion of the storage medium 21 to pull it out from the housing portion 22 (see FIG. 3).

The opening 22a is constituted to be closed by the doors, that is, an upper door 24 and side doors 25 and 26.

Figure 2A:
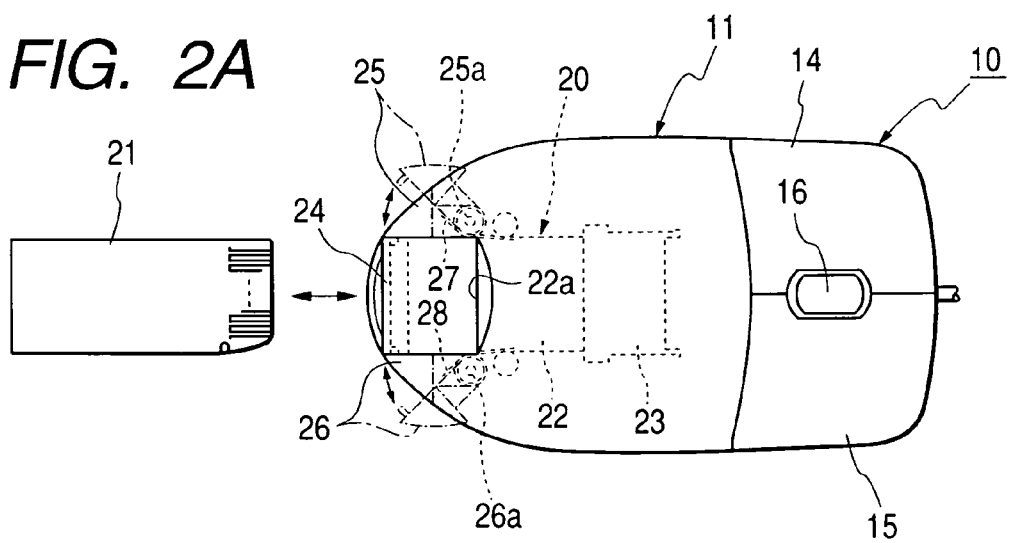
FIG. 2A is a schematic plan view of the mouse.
Figure 2B:
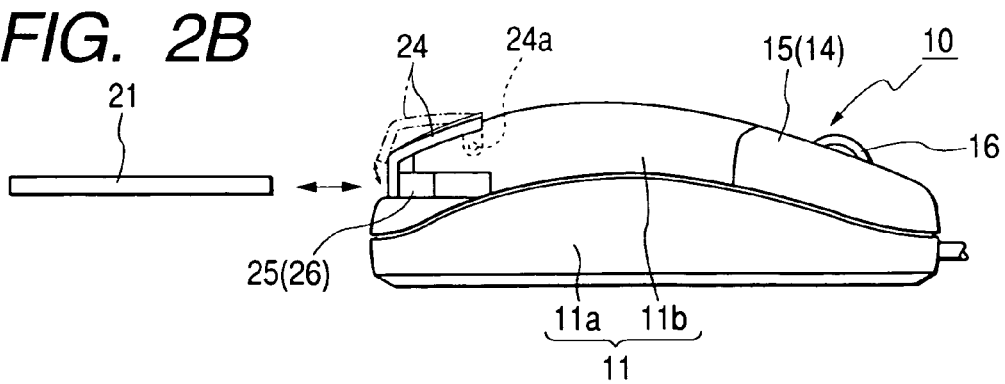
FIG. 2B is a schematic side view of the mouse.

The upper door 24 has almost the same width as that of the housing portion 22, and is pivotally supported around a horizontal shaft 24a shown in FIG. 2B and is pivoted between a closing position shown in a solid line and an opening position shown in a dashed line.

Each of the side doors 25 and 26 is constituted to have almost the same height as that of the housing portion 22 and is formed to cover both sides of the end on this side of the housing portion 22. They are respectively pivotally supported on rotary shafts 25a and 26a on the innermost edge so as to pivotable between the closing position indicated by the solid line and the opening position indicated by the dashed line. They are respectively urged by springs 27 and 28 so as to open laterally.

Furthermore, the side doors 25 and 26 include projections 25b and 26b protruded inwardly which are provided on inner side faces opposed to each other. An inner end portion of the upper door 24 is engaged with the projections 25b and 26b so that the upper door 24 is engaged in the closing position when the side doors 25 and 26 are set in the closing position. In this configuration, when the operator opens the upper door 24 upward, the engagement of the upper door 24 is simultaneously released from the projections 25b and 26b so that the side doors 25 and 26 are opened laterally over the whole width of the housing portion 22 according to the urging force of the springs 27 and 28.

In this state, the operator inserts the storage medium 21 into the housing portion 22 from the opening 22a. In such a state that the storage medium 21 is completely inserted, the terminal section on the edge of the storage medium 21 is electrically connected to the connector 23. When the operator moves the side doors 25 and 26 to the closing position against the urging force of the springs 27 and 28 and moves the upper door 24 to the closing position. At this time, when the operator releases the side doors 25 and 26, the side doors 25 and 26 are pivoted outward by the urging force of the springs 27 and 28 so that the projections 25b and 26b are engaged with the inner end of the upper door 24. Consequently, the upper door 24 is engaged in the closing position and the side doors 25 and 26 are held in the closing position against the urging force of the springs 27 and 28.

The storage medium 21 thus accepted in the housing portion 22 is connected to the USB connector of the personal computer via the connector 23, the USB hub and the cable 19. Based on an instruction sent from the personal computer, the data processor 100 writes and/or reads data to/from the storage medium 21.

In order to take out the storage medium 21 from the housing portion 22, the upper door 24 is opened so that the side doors 25 and 26 are opened laterally by the urging force of the springs 27 and 28. The operator holds the ends of the storage medium 21 which are exposed to both sides of the housing portion 22, and then pulls it out.

The upper door 24 may be urged toward the opening position through a spring. In this case, the opening and closing operations can be performed more easily.

While the closing operation can be carried out by the upper door 24 and the side doors 25 and 26 in the embodiment, it may be performed by only the side doors 25 and 26, or by only the upper door 24, in accordance with the shape of the mouse 10.

In this embodiment, a USB plug (not shown) provided with a leading end of the cable 19 is connected to a USB connector provided in a personal computer, thereby the mouse 10 is connected to the personal computer.

The mouse 10 serves as a coordinate input device on a flat surface such as a desk top.

Here, light emitted from the LED 13 illuminates, through the lens optics 17, a region of the flat surface which is opposite to the light receiving face 12a of the optical movement detector 12. On the other hand, light reflected from the illuminated region is incident on the light receiving face 12a through the lens optics 17.

When a operator moves the case 11 of the mouse 10 in a horizontal direction over the flat surface, the reflected light incident on the light receiving face 12a of the optical movement detector 12 is changed with the relative movement of the illuminated region so that the optical movement detector 12 detects the direction and the amount of the relative movement based on the change in the reflected light. Moreover, when the operator depresses the operation buttons 14 and 15, the switches 14a and 15a are operated. When the operator operates the wheel 16, a sensor which is not shown detects the rotation amount thereof.

Consequently, the detection signal of the optical movement detector 12, the on/off operation of the switches 14a and 15a and the rotation amount of the wheel 16 are processed by a proper processing circuit, to be transmitted to the personal computer via the USB control circuit, the USB hub and the cable 19. Consequently, a cursor is moved over a screen of a display unit in the personal computer which is not shown corresponding to the direction and amount of the movement of the case 11 and a proper processing is carried out by the operation of the operation buttons 14 and 15 and the wheel 16.

Moreover, the mouse 10 also serves as an adapter unit for the storage medium 21.

In this case, the operator first opens the upper door 24 of the mouse 10 upward, subsequently opens the side doors 25 and 26 laterally, and then inserts the storage medium 21 into the opening 22a. In such a state that the storage medium 21 is completely inserted, the terminal section formed on the edge of the storage medium 21 is electrically connected to the connector 23. In this state, the operator closes again the side doors 25 and 26, and the upper door 24 to cover the opening 22a of the mouse 10. Consequently, the storage medium 21 is not protruded from the surface of the case 11 during the use of the mouse 10 while preventing foreign matters such as dust from entering from the opening 22a to the inside thereof. Therefore, the operability of the mouse 10 is not deteriorated and data is communicated between the storage medium 21 and the personal computer.

When the operator takes out the storage medium 21 from the mouse 10, the operation is repeated to open the upper door 24 and the side doors 25 and 26, the storage medium 21 is pulled out, and the upper door 24 and the side doors 25 and 26 are then closed.

As has been described heretofore, according to the invention, the adapter unit 20 does not occupy the PC card slot differently from the conventional configuration, and the connection cable of the mouse 10 is connected to the USB connector of the personal computer so that the adapter unit 20 is simultaneously connected to the personal computer.

Therefore, the connection cable can be prevented from being complicated and the adapter unit 20 can be connected to the personal computer easily and simply.

Further, since the opening 22a of the housing portion 22 of the adapter unit 20 is always closed by the doors 24, 25 and 26 except when the storage medium 21 is loaded or unloaded. Therefore, foreign matters such as dust can be prevented from entering the case 11 through the opening 22a, and the storage medium 21 is not protruded from the surface of the case 11 during the use of the mouse 10. Therefore, the operator does not feel incongruousness while operating the mouse 10.

Figure 5:
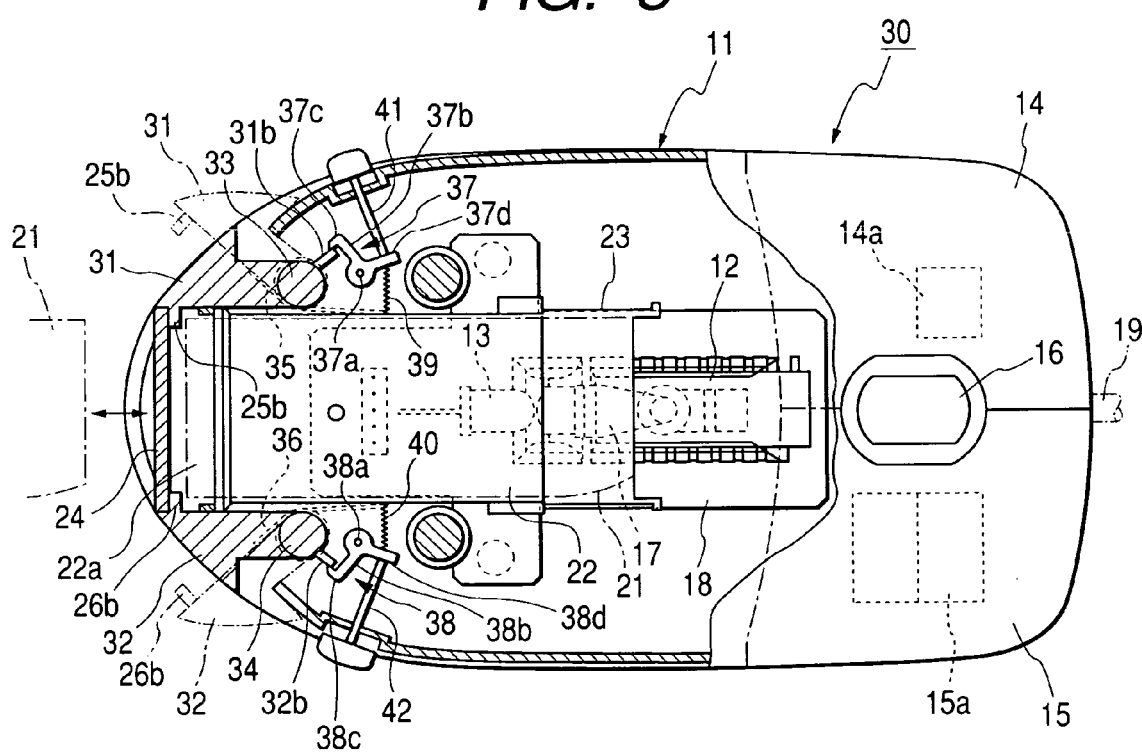
FIG. 5 is a partially-sectional plan view showing a mouse according to a second embodiment of the invention.
Figure 6:
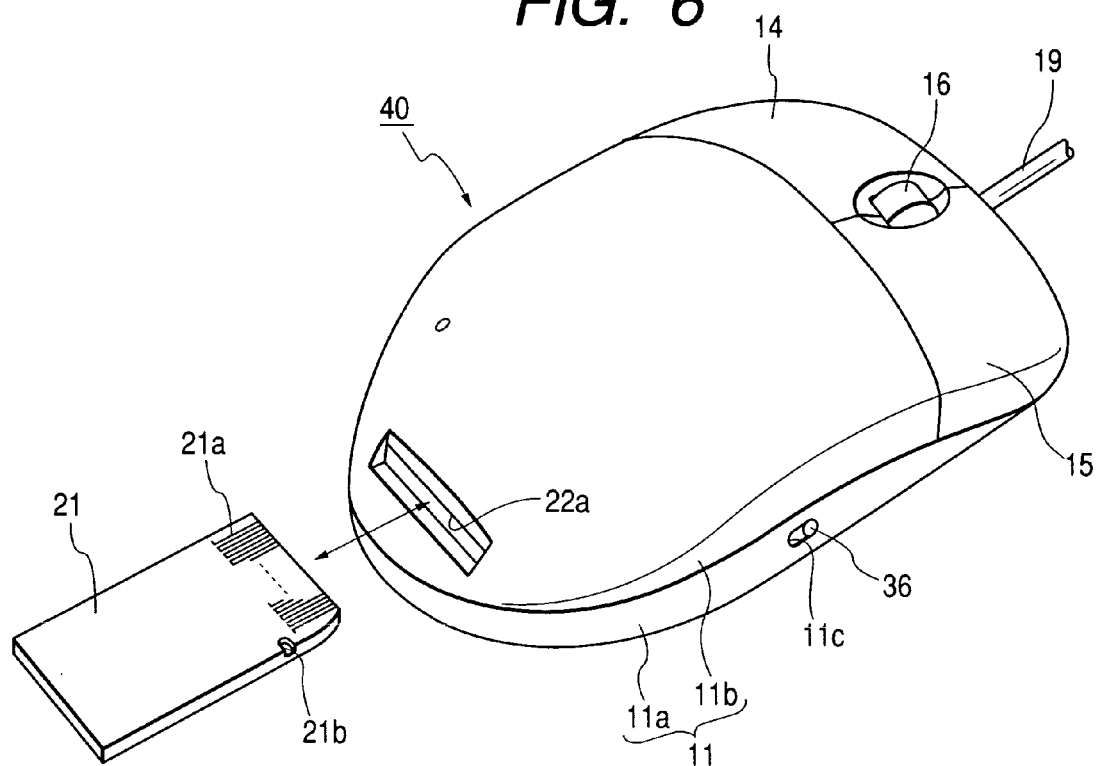
FIG. 6 is a schematic perspective view showing a mouse according to a third embodiment of the invention.
Figure 7:
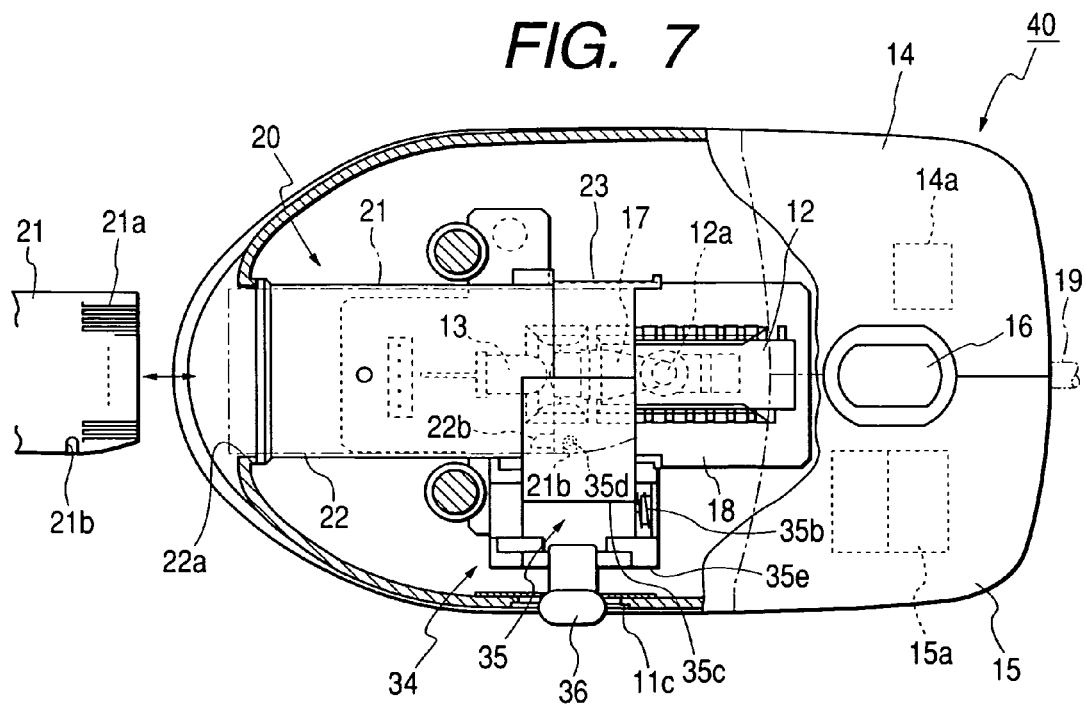
FIG. 7 is a partially-sectional plan view showing the mouse in FIG. 6.
Figure 8:
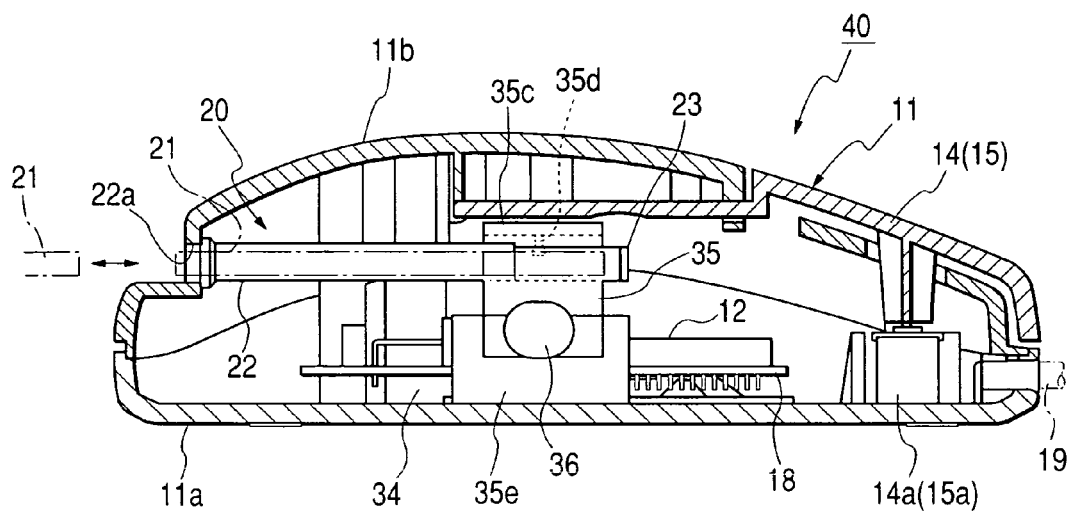
FIG. 8 is a vertical sectional view in a longitudinal direction showing the mouse in FIG. 6.
Figure 9:
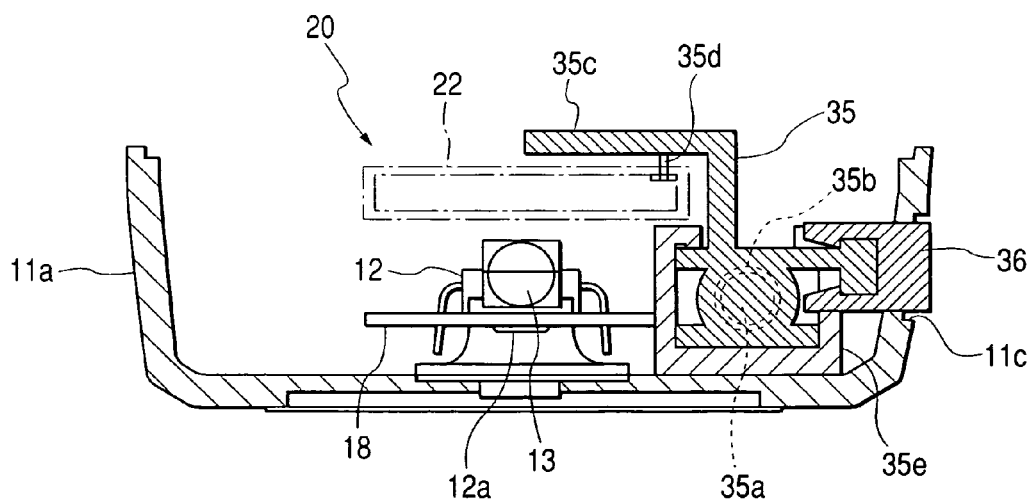
FIG. 9 is a vertical sectional view in a transverse direction showing only a lower case in the mouse of FIG. 6.

FIG. 5 shows a mouse according to a second embodiment of the invention.

In FIG. 5, a mouse 30 has basically the same structure as that of the mouse 10 of the first embodiment, and is different in that side doors 31 and 32 are provided in place of the side doors 25 and 26. Same parts are designated by identical reference numbers and the detailed explanation for the parts will be omitted.

The side doors 31 and 32 are pivotally supported on vertical rotary shafts 33 and 34 on front edges thereof and are urged through springs 35 and 36 such that the rear side is opened laterally.

Furthermore, the side doors 31 and 32 are formed with projections 31b and 32b protruded toward the outside of the rotary shafts 33 and 34.

The projections 31b and 32b are engaged with hooks 37c and 38c provided on the tips of arms 37b and 38b of levers 37 and 38 which are pivotally supported on pivotal shafts 37a and 38a behind the rotary shafts 33 and 34.

Arms 37d and 38d of the levers 37 and 38 are urged toward the outside through springs 39 and 40 and are pushed toward the inside through the tips of release buttons 41 and 42 protruded from both sides of a case 11.

In the same manner as the mouse 10 described above, the mouse 30 having such a structure is operated as a coordinate input device and an adapter unit of a storage medium 21. When the release buttons 41 and 42 are pushed, the levers 37 and 38 are pivoted against the urging force of the springs 39 and 40, and the hooks 37c and 38c are thereby released from the projections 31b and 32b of the doors 31 and 32. Thus, the doors 31 and 32 are pivoted to an opening position by the urging force of the springs 35 and 36. Consequently, the upper door 24 is pivoted to the opening position by the urging force of a spring which is not shown with the opening operation of the doors 31 and 32. Therefore, an opening 22a of a housing portion 22 is opened so that the storage medium 21 can be inserted in and pulled out from the housing portion 22.

In order to close each of the doors 31, 32 and 24, the operator first moves the upper door 24 to the closing position against the urging force of the springs and then moves the side doors 31 and 32 to the closing position against the urging force of the springs 35 and 36. Consequently, the side doors 31 and 32 are engaged in the closing position through the levers 37 and 38, and the upper door 24 is engaged with the projections 25b and 26b provided on the side faces of the side doors 25 and 26 in the same manner as in the case of the side doors 25 and 26 according to the first embodiment. Consequently, the upper door 24 is also engaged in the closing position.

FIGS. 6–9 show a mouse 40 according to a third embodiment of the invention. The mouse 40 has basically the same structure as that of the mouse 10 of the first embodiment, and is different in that the adapter unit 20 is provided with a storage medium ejector 34, and in that no door member is provided. Same parts are designated by identical reference numbers and the detailed explanation for the parts will be omitted.

The storage medium ejector 34 is constituted by a slider 35 slidably supported on the case 11 in the inserting/ejection direction of the storage medium 21 on one of the sides of the housing portion 22, and an operating portion 36 extended from the slider 35 toward the side of the case 11.

The slider 35 is slidably supported on a guide shaft 35a provided in the case 11 and extended in the ejecting direction, and is urged in an opposite direction to the ejecting direction by a tension spring 35b.

Furthermore, the slider 35 has a part 35c extended to the upper part of the housing portion 22 and the lower face of the extended portion 35c is provided with a projection 35d to be engaged with a concave portion 21b provided on the upper face of the storage medium 21 through a guide groove 22b provided in the housing portion 22. In the drawing, 35e denotes a guide rail capable of causing the slide 35 to run stably.

The concave portion 21b provided on the upper face of the storage medium 21 is not newly provided for ejecting the storage medium 21 but has already been provided in the storage medium 21 put on the market.

Moreover, while the projection 35d of the slider 35 is constituted to be engaged with the concave portion 21b of the storage medium 21 as described above, the projection 35d of the slider 35 may be engaged with the insertion end of the storage medium 21.

Moreover, the operating portion 36 is integrally attached to the slider 35 on the inside of the case 11 and is exposed to the side face of the case 11 through a slot 11c provided on the side face of the lower case 11a of the case 11 and extended in the ejecting direction.

During the data writing/reading operations are performed, since the slider 35 of the storage medium ejector 34 is urged in the opposite direction to the ejecting direction by the tension of the spring 35b, it is possible to prevent such a situation that the slide 35 is accidentally moved in the ejecting direction and the terminal section 21a of the storage medium 21 is removed from the connector 23.

In order to eject the storage medium 21 from the housing portion 22, the user moves the operating portion 36 exposed to the side face of the case 11 in the ejecting direction. Consequently, the slider 35 provided integrally with the operating portion 36 is similarly moved in the ejecting direction against the tension of the spring 35b. In that case, the projection 35d is moved while pushing out the storage medium 21 in the ejecting direction. Accordingly, the storage medium 21 is moved toward the opening 22a in the housing portion 22 and an end thereof is stopped in such a position as to be protruded from the opening 22a of the housing portion 22 by a predetermined dimension.

The user pulls out the end of the storage medium 21 protruded from the opening 22a by hands so that the storage medium 21 is taken out of the housing portion 22.

Then, the slider 35 is moved back in an opposite direction to the ejecting direction according to the tension of the spring 35b.

According to this configuration, when the storage medium is ejected from the housing portion, the user operates the storage medium ejector so that the storage medium is pushed out of the housing portion and the end of the storage medium is exposed from the opening. Consequently, the user can easily take out the storage medium by holding the end of the storage medium protruded from the opening by hands and pulling out the storage medium from the housing portion.

Of course, this storage medium ejector can be applied to the configurations according to the first and the second embodiments. In this case, a mechanism for interlocking the storage medium ejector and the door members may be provided.

While the operation buttons 14 and 15 and the wheel 16 are provided on the upper face or side face of the case 11 in the above embodiments, the operation buttons may be provided in any position of the case in order to enhance operability.

While the mouse comprises the two operation buttons 14 and 15 in the above embodiments, it is apparent that three or more operation buttons may be provided.

Although the optical movement detector 12 and the LED 13 are mounted on the board 18 in the embodiment, the board 18 may be omitted. In this case, the components, that is, the optical movement detector 12 and the LED 13 are attached into predetermined positions on an inner face of the lower case 11a or the upper case 11b in the case 11.

While the mouse 10 is constituted as a mouse for a so-called USB interface in the embodiment, it may be constituted as a mouse in the PS/2 standard or may be constituted as a so-called wireless mouse utilizing infrared rays.

Although the mouse is constituted to optically detect the horizontal movement of the mouse through the optical movement detector 12 and the LED 13 in the above embodiments, it is apparent that the invention can also be applied to a mouse comprising a mechanical movement detector which mechanically detects the direction and rotation amount of the ball.

What is claimed is:

1. A mouse connected to a personal computer, comprising:
    a casing body, provided with a space for housing a removable data storage medium therein;
    a data processor, which communicates data bidirectionally between the personal computer and the data storage medium housed in the casing body; and
    a door member which covers an opening formed on the casing body, through which the data storage medium is inserted or ejected, in a closed position thereof,
    wherein the door member constitutes a part of an outer face of the casing body at the closed position thereof, the door member being at the closed position after insertion or ejection of the data storage medium,
    wherein the door member includes a pair of first doors which is pivotable laterally.

2. The mouse as set forth in claim 1, wherein the door member includes a second door which is pivotable vertically.

3. The mouse as set forth in claim 2, wherein the second door retains the first doors at the closed position thereof, when the second door is closed.

4. The mouse as set forth in claim 3, further comprising an urging member which urges at least one of the first doors and the second door toward an opened position thereof.

5. The mouse as set forth in claim 1, further comprising an urging member which urges the door member toward the closed position thereof.

6. The mouse as set forth in claim 5, further comprising a button member, which opens the door member against the urging force of the urging member when the button member is depressed.

7. The mouse as set forth in claim 1, further comprising an ejector for moving the data storage medium housed in the casing body toward the opening.

8. The mouse as set forth in claim 7, wherein the ejector includes a slider which is supported within the casing so as to be slidable in an inserting/ejecting direction of the data storage medium.

9. The mouse as set forth in claim 8, wherein the slider includes a projection engaged with a concave portion which is previously formed on the data storage medium.

10. The mouse as set forth in claim 8, wherein the slider includes an operating member which is exposed to the outside of the casing body so as to be movable in the inserting/ejecting direction of the data storage medium; and
    wherein the operating member is moved toward the ejecting direction so that the slider is moved toward the opening.

11. The mouse as set forth in claim 8, wherein the slider is always urged toward the inserting direction of the data storage medium.

12. The mouse as set forth in claim 1, further comprising a cable, through which the data processor communicates the data.

13. The mouse as set forth in claim 12, wherein the cable is connected to a USB standard connector provided with the personal computer.

14. The mouse as set forth in claim 12, wherein the cable is connected to a PS/2 standard connector provided with the personal computer.

15. The mouse as set forth in claim 1, wherein the data processor communicates the data wirelessly.

16. The mouse as set forth is claim 1, wherein said removable data storage medium is usable by a device other than the computer as auxiliary storage for reading and writing data, and
    wherein said data communication by said data processor uses an interface used for connecting said mouse to said other device.

* * * * *